United States Patent
Kera et al.

(10) Patent No.: US 10,252,345 B2
(45) Date of Patent: Apr. 9, 2019

(54) MACHINE TOOL

(71) Applicants: Citizen Watch Co., Ltd., Tokyo (JP); Citizen Machinery Co., Ltd., Nagano (JP)

(72) Inventors: Yasuhiro Kera, Saitama (JP); Noriyuki Asahara, Saitama (JP); Hiroshi Kasuya, Tokyo (JP); Kyota Kotake, Saitama (JP)

(73) Assignees: Citizen Watch Co., Ltd., Tokyo (JP); Citizen Machinery Co., Ltd., Nagano (JP)

( * ) Notice: Subject to any disclaimer, the term of this patent is extended or adjusted under 35 U.S.C. 154(b) by 190 days.

(21) Appl. No.: 14/386,484

(22) PCT Filed: Mar. 21, 2013

(86) PCT No.: PCT/JP2013/058069
§ 371 (c)(1),
(2) Date: Sep. 19, 2014

(87) PCT Pub. No.: WO2013/146525
PCT Pub. Date: Oct. 3, 2013

(65) Prior Publication Data
US 2015/0068002 A1    Mar. 12, 2015

(30) Foreign Application Priority Data

Mar. 26, 2012    (JP) ................................ 2012-069984

(51) Int. Cl.
*B23B 29/24*    (2006.01)
*B23B 29/26*    (2006.01)

(52) U.S. Cl.
CPC .............. *B23B 29/24* (2013.01); *B23B 29/26* (2013.01); *Y10T 29/517* (2015.01);
(Continued)

(58) Field of Classification Search
CPC ..... B23B 29/24; B23B 29/26; Y10T 29/5168; Y10T 29/517; Y10T 29/5173; Y10T 82/2541; Y10T 82/2543; Y10T 82/16622
(Continued)

(56) References Cited

U.S. PATENT DOCUMENTS 6,928,909 B1 *  8/2005  Akimoto ................. B23B 3/065
                                                            29/27 C
7,267,035 B2 *  9/2007  Uebelhart ............. B23B 29/323
                                                            29/54
(Continued)

FOREIGN PATENT DOCUMENTS

EP    1321212 A1    6/2003
JP    06246501 A  *  9/1994
(Continued)

*Primary Examiner* — Erica E Cadugan
*Assistant Examiner* — Michael Vitale
(74) *Attorney, Agent, or Firm* — Howson & Howson LLP

(57) ABSTRACT

A machine tool includes a movement device, which has a first feed shaft and a second feed shaft that mutually intersect, and a plurality of tools, which are driven by the movement device and respective blade edges of which are staggered stepwise. The blade edges of the tools are aligned with the second axis due to the inclination of the tools as a unit. The machine tool is capable of executing center level adjustment of a plurality of tools mounted on a tool post against a workpiece having a larger diameter, and is also capable of reducing wasted time in non-cutting operation via equal stroke lengths of the tools.

12 Claims, 12 Drawing Sheets

(52) U.S. Cl.
CPC ........ *Y10T 29/5109* (2015.01); *Y10T 29/5168* (2015.01); *Y10T 82/16622* (2015.01); *Y10T 82/2543* (2015.01); *Y10T 82/2587* (2015.01)

(58) Field of Classification Search
USPC .................. 29/50, 51, 54; 82/81, 137, 138
See application file for complete search history.

(56) References Cited

U.S. PATENT DOCUMENTS

| | | | | |
|---|---|---|---|---|
| 2006/0225544 | A1* | 10/2006 | Uebelhart | B23B 29/323 82/138 |
| 2010/0262274 | A1* | 10/2010 | Kasuya | B23B 3/30 700/192 |
| 2010/0268371 | A1* | 10/2010 | Kasuya | B23B 3/30 700/114 |
| 2011/0158775 | A1* | 6/2011 | Ando | B23B 3/36 414/222.07 |

FOREIGN PATENT DOCUMENTS

| | | | |
|---|---|---|---|
| JP | 06246508 A | * | 9/1994 |
| JP | 07308803 | | 11/1995 |
| JP | 2001300802 | | 10/2001 |

* cited by examiner

X1: CUT-IN DIRECTION
Y1: ARRANGEMENT DIRECTION OF TOOLS
A: FIRST FEED AXIS
B: SECOND FEED AXIS

X1: CUT-IN DIRECTION
Y1: ARRANGEMENT DIRECTION OF TOOLS
A: FIRST FEED AXIS
B: SECOND FEED AXIS

MACHINE TOOL

FIELD OF THE INVENTION

This invention relates to a machine tool having a plurality of tools arranged in a comb-teeth manner.

BACKGROUND OF THE INVENTION

There is a known NC automatic lathe that includes feed screws along two mutually orthogonal axis directions on a plane orthogonal to a z axis, which is along a center line of a spindle, and that moves a tool post on an orthogonal X-Y coordinate system inclined against an orthogonal A-B coordinate system consisting of the axial directions of the feed screws to machine a workpiece (see Japanese laid-open patent application No. H7-308803, for example). In this case, a plurality of tools arranged along a Y axis direction of the X-Y coordinate system moves in an X axis direction of the X-Y coordinate system to cut into the workpiece and perform machining.

Also, Japanese laid-open patent application No. 2001-300802 discloses a method for adjusting a blade edge position of respective cutting tools provided on a comb-toothed tool post of a machine tool, such as an NC lathe, against a material to be machined on the basis of machining data. According to this method, when the NC lathe machines a bar, the comb-toothed tool post, on which cutting tools used for machining operations have been mounted, is moved so that a blade edge of a particular cutting tool whose blade edge position is to be adjusted comes into contact with a lateral desired point of the bar held at an actual machining position. The lateral desired point is circumferentially approximately 90 degrees away from a vertex of the bar, the vertex being a point with which the blade edges of respective cutting tools come into contact in machining operation. On the basis of a Y coordinate value of the lateral desired position and a premeasured radius of the bar, a Y coordinate value (absolute value) of the center, or rotational axis, of the bar is determined. Then, the blade edge of the particular cutting tool is moved to the Y coordinate value of the rotational axis of the bar so that it can come into contact with the vertex of the bar to perform a cutting operation. This enables highly accurate machining.

As shown in FIG. 10A, the above-described blade edge position adjustment is difficult to execute against a bar having a radius larger than the radius Ra of a bar W1 that abuts an adjacent cutting tool, because the adjacent cutting tool interferes with the execution of the blade edge position adjustment. Thus, as shown in FIG. 10B, in a machine tool disclosed in Japanese laid-open patent application No. 2001-300802, blade edges of respective tools 220 are staggered, in a stepwise fashion, in a cut-in direction of the tools 220, which is orthogonal to the arrangement direction of the tools. Thus, the blade edge position adjustment can be executed against a bar W2 having a radius Rb that is larger than the distance between two adjacent tools.

SUMMARY OF THE INVENTION

The above-described machine tool, however, has a problem in that, because the blade edges of the respective tools 220 are staggered stepwise in the cut-in direction, as shown in FIG. 11 extra stroke lengths d1, d2, d3, and d4, corresponding to the amount of the staggering, exist for the tools 220 when blade edge position adjustment is executed to switch between the tools 220, and when the respective tools 220 cut into a workpiece W3.

For example, when the blade edge of a tool T0 of tools 220 moves to a position corresponding to the Y coordinate value Y0 of the rotational axis of the bar, tools T1, T2, T3, and T4 need to move additionally by the extra stroke lengths d1, d2, d3, and d4, respectively, in the cut-in direction in comparison with a tool T0. In other words, the tools T1, T2, T3, and T4 need to move the extra stroke lengths d1, d2, d3, and d4, respectively, for machining operation, and also need to move back the same extra stroke lengths for switching between tools T0, T1, T2, T3, and T4. This amounts to wasted time in non-cutting operation, and extended machining time.

Also, when the blade edges of the respective tools 220 are staggered stepwise in the cut-in direction, the feed screws need to be adapted for moving the tool post by the extra stroke length d4, which is the maximum amount of stagger of the tools 220, in addition to the stroke length of the tool T0 in the cut-in direction. The resulting total stroke length, however, is unnecessarily long for tools staggered by an amount less than d4. Due to the elongation of the feed screws, the machine tool becomes larger and the machining time is extended.

Thus, a technical problem to be solved by the invention, or an object of the invention, is to provide a machine tool that is capable of executing blade edge position adjustment of a plurality of attached tools against a bar having a larger diameter, and that is also capable of reducing wasted time in non-cutting operation.

According to a first aspect of the invention, a machine tool includes a movement device, which has a first feed axis and a second feed axis that mutually intersect, and a plurality of tools, which are movable as a unit with the movement device. Respective blade edges of the plurality of tools are staggered stepwise. The tools are arranged such that their blade edges are aligned with a straight line along a selection axis for selecting between the tools.

According to a second aspect of the invention, one of the first and second feed axes is selected as the selection axis, and the tools are inclined as a unit so that their blade edges are aligned with the one of the first and second feed axes.

According to a third aspect of the invention, the first feed axis and the second feed axis are respectively set in a horizontal direction and a vertical direction that are orthogonal to each other.

According to a fourth aspect of the invention, the plurality of tools is arranged in the vertical direction.

According to a fifth aspect of the invention, a blade edge of an upper tool of any two adjacent tools of the plurality of tools projects with respect to a blade edge of the lower tool of the two adjacent tools for only a certain length such that cutting chips generated in machining operation with the upper tool do not fall on the lower tool.

According to a sixth aspect of the invention, with respect to the one of the first and second feed axes that is selected as the selection axis, the other of the first and second feed axes is inclined along a direction of the inclination of the tools.

In the machine tool according to the first aspect of the invention, because the blade edges of the respective tools are aligned with a straight line along the selection axis for selecting between the tools, each tool can be directly moved to a tool standby position, and wasted time in non-cutting operation can thus be reduced. By moving the tools on the selection axis, the tools can be switched regardless of the staggering amount of stagger of the respective blade edges to machine a workpiece. As with the known art, because the blade edges of the respective tools are staggered in the cut-in direction in a stepwise fashion, the blade edge position adjustment can be executed against a bar having an outer diameter larger than the distance between any two adjacent tools.

In the machine tool according to the second aspect of the invention, the tools can be switched easily by moving the tools along the first feed axis or the second feed axis. Each tool can machine a workpiece without moving an extra stroke length in accordance with the amount of stagger of its blade edge, and the first feed axis or the second feed axis can be made compact.

In the machine tool according to the third aspect of the invention, because the stroke lengths in the horizontal direction and the vertical direction do not need to be made longer, the machine tool can be made compact both in the horizontal direction and in the vertical direction.

In the machine tool according to the fourth aspect of the invention, because the stroke length in the horizontal direction does not need to be made longer, the machine tool can be made compact in the horizontal direction.

In the machine tool according to the fifth aspect of the invention, because cutting chips generated in machining operation do not fall on the lower tool, adhesion of the cutting chips to the tools can be prevented.

In the machine tool according to the sixth aspect of the invention, because each tool can be selected by driving only one of the feed axes selected as the selection axes, the load on the machine tool can be reduced.

DETAILED DESCRIPTION OF THE PREFERRED EMBODIMENTS

Figure 1:
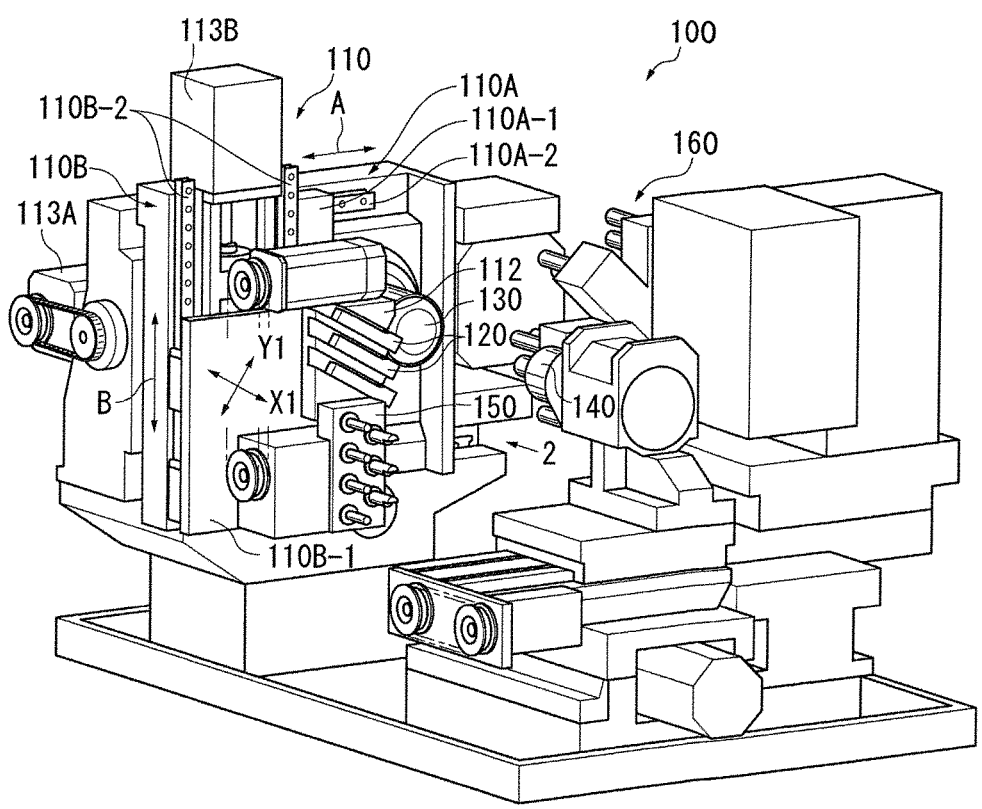
FIG. 1 is a perspective view of a machine tool in accordance with an embodiment of the invention.
Figure 2:
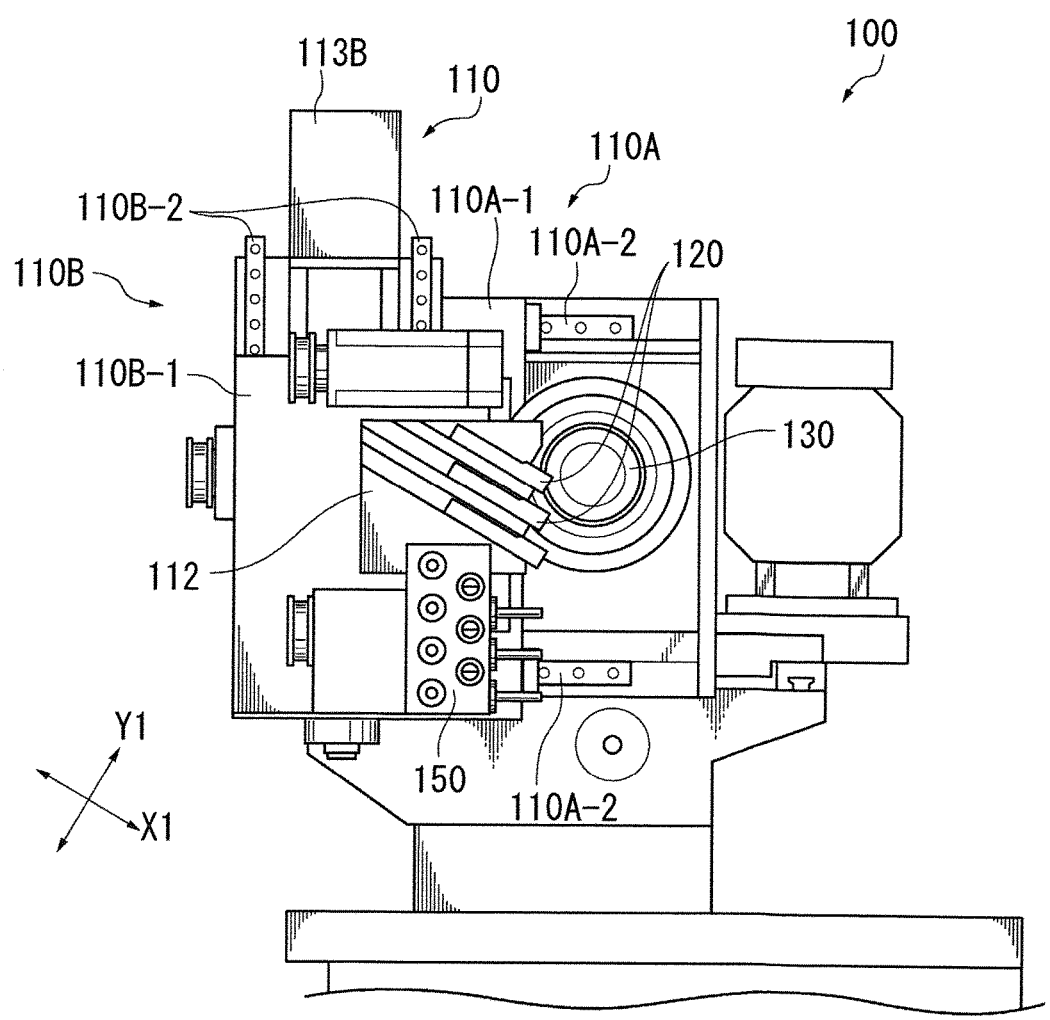
FIG. 2 is an internal front view of the machine tool in accordance with the embodiment of the invention as seen from an interior to a front spindle side.

The machine tool 100 shown in FIGS. 1 and 2 is a machine tool such as an NC automatic lathe, and includes a plurality of tools 120 such as cutting tools, supported on a tool post 112, a front spindle 130, a back spindle 140, a back tool post 150, and a turret 160. The machine tool 100 is capable of machining a workpiece by gripping and rotating the workpiece by the front spindle 130 and the back spindle 140 at different times.

The tool post 112 is movably supported via a feed mechanism 110A on a first feed axis A and a feed mechanism 110B on a second feed axis B, the first feed axis A and the second feed axis B being mutually orthogonal. The feed mechanisms 110A and 110B constitute a movement device 110 for the tool post 112. The first feed axis A and the second feed axis B are orthogonal to the axis Z1 (FIG. 3) of the front spindle 130.

Figure 3:
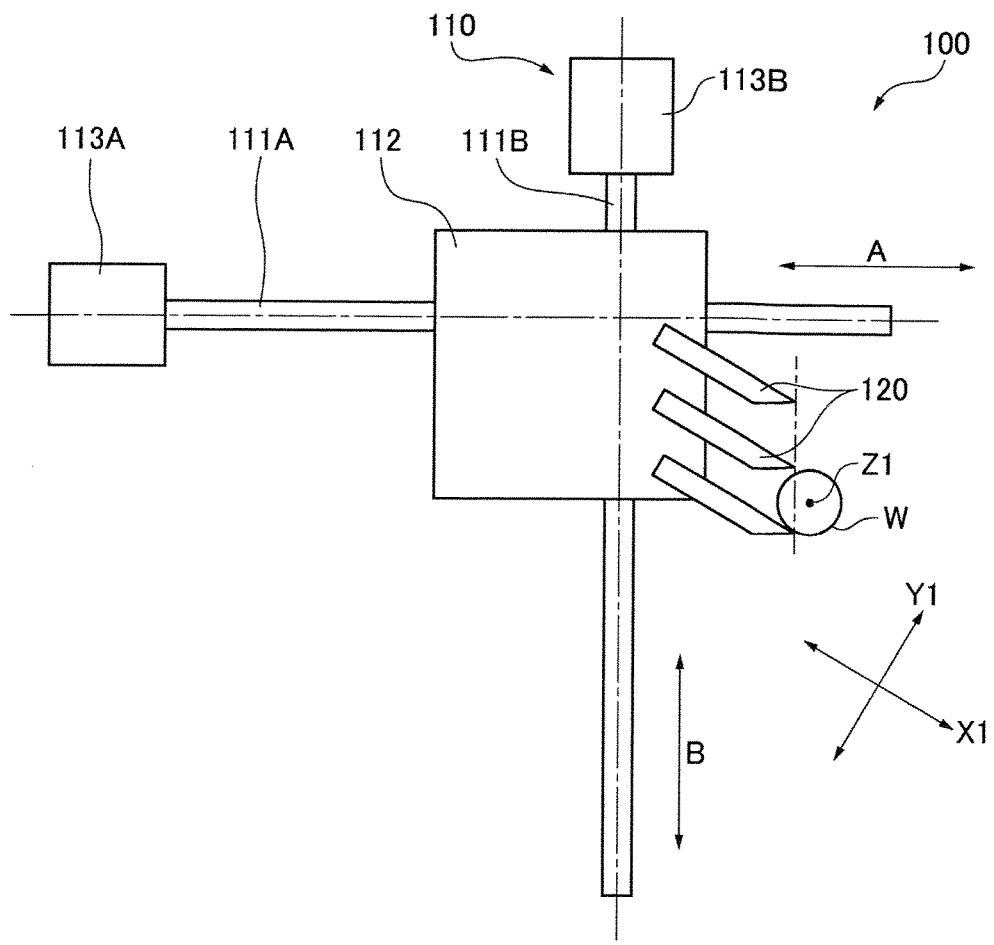
FIG. 3 is a main part schematic front view of the machine tool in accordance with the embodiment of the invention.

As shown in FIGS. 1 to 3, the feed mechanism 110A on the first feed axis A includes a first slide stand 110A-1 that is slidably supported on a slide rail 110A-2 along the first feed axis A and that is driven by a first feed screw 111A (FIG. 3) along the first feed axis A. The first feed screw 111A is rotationally driven by a first motor 113A. The driving force of the first motor 113A moves the first slide stand 110A-1 along the first feed axis A. The feed mechanism 110B on the second feed axis B includes a second slide stand 110B-1 that is slidably supported on a slide rail 110B-2 along the second feed axis B and that driven by a second feed screw 111B along the second feed axis B. The second feed screw 111B is rotationally driven by a second motor 113B. The driving force of the second motor 113B moves the second slide stand 110B-1 along the second feed axis B. The tool post 112 is mounted on the second slide stand 110B-1 and moves along the first feed axis A via the rotation of the first feed screw 111A and along the second feed axis B via the rotation of the second feed screw 111B.

The tools 120 are mounted on the tool post 112 as a unit. The movement device 110 can move the tool post 112 in any direction with the combined action of the first feed screw 111A and the second feed screw 111B. The machine tool 100 can machine a round, bar-shaped workpiece W held by the front spindle 130 shown in FIGS. 1 and 2 while switching between the tools 120 by moving the tools 120 in any direction via the movement device 110.

Figure 4:
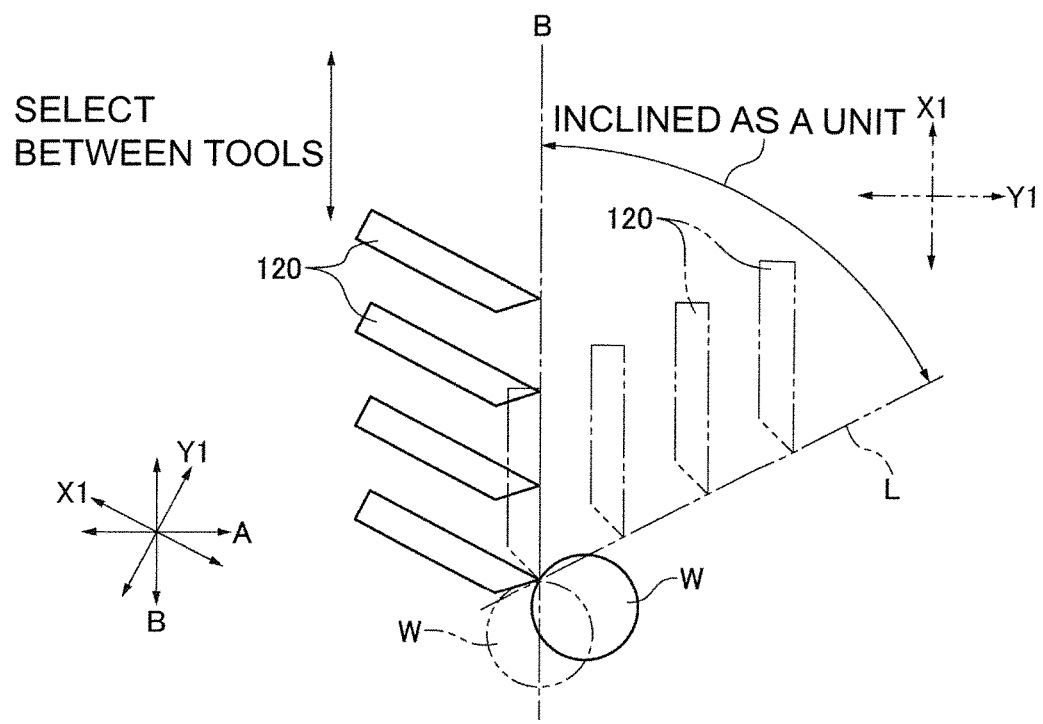
FIG. 4 is a conceptual diagram describing an inclined state of a plurality of tools with respect to a second feed shaft.

The tools 120 are arranged in parallel to one another along a Y1 axis direction that is inclined with respect to the first feed axis A and the second feed axis B. As shown in FIG. 4, with a broken line illustrating the Y1 axis direction as a horizontal direction, the tools 120, shown in broken lines, are arranged so that the blade edges thereof are staggered stepwise in an X1 axis direction perpendicular to the Y1 axis direction. The blade edges of the respective tools 120 are proportionally staggered, and are positioned on a straight line L. As shown in FIG. 4 with solid lines, the tools 120 are inclined as a unit so that the straight line L is aligned with the first feed axis B.

Thus, an X1-Y1 coordinate system consisting of the X1 axis direction and the Y1 axis direction is rotated through a predetermined angle with respect to an A-B coordinate system consisting of the first feed axis A and the second feed axis B. With this configuration, each of the blade edges comes into contact with the workpiece W at a top of the workpiece W in the X1 axis direction in machining operation, and the X1 axis direction becomes a cut-in direction of the tools 120.

Figure 5:
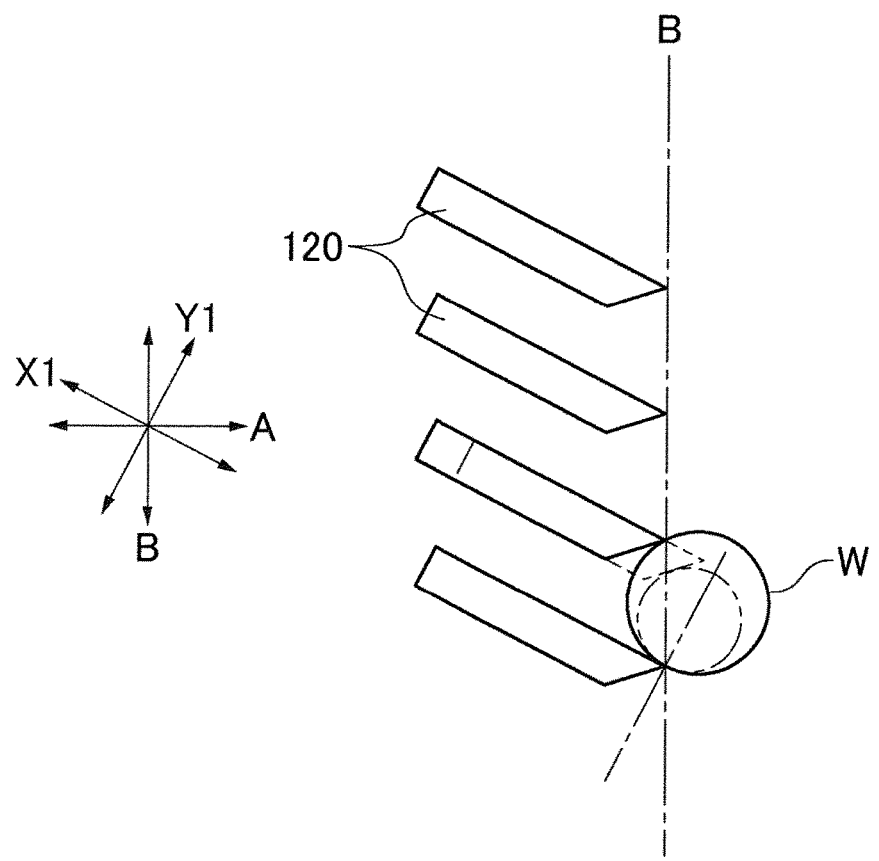
FIG. 5 is a conceptual diagram describing one step of a center level adjustment method.

Because each of the blade edges comes into contact with the workpiece W at a top of the workpiece W in the X1 axis direction in machining operation, the blade edge position adjustment is executed, as shown in FIG. 5, by first contacting a blade edge of a particular tool 120 with a top of the workpiece W in the Y1 axis direction, and then, as in conventional machining, determining a Y1 coordinate value (as an absolute value) of a center, or rotational axis, of the workpiece W by using the Y1 coordinate value of the contacting position and a premeasured radius of the workpiece W. Even though the blade edges of the respective tools 120 are positioned along and aligned with the second feed axis B, the blade edges are staggered in the X1 axis direction in a stepwise fashion. Thus, the blade edge position adjustment can be executed against a workpiece W having an outer diameter larger than the distance between two adjacent tools 120.

Figure 6:
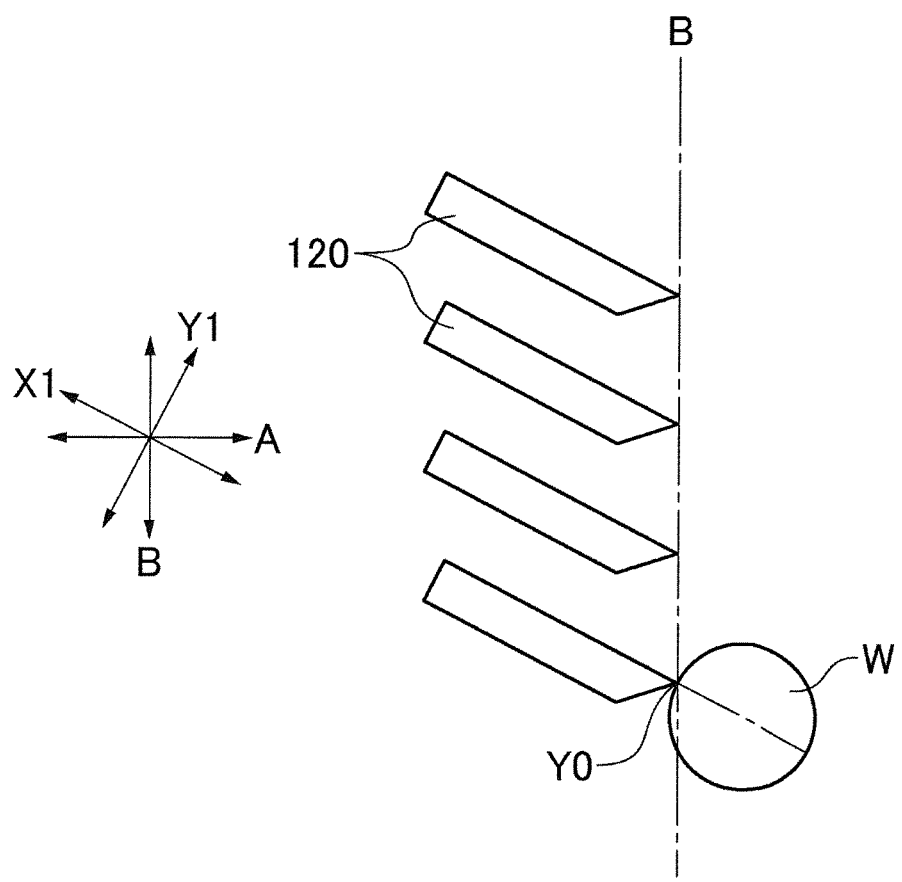
FIG. 6 is a conceptual diagram describing a state in which a tool cuts into a workpiece.

As shown in FIG. 6, the blade edge of the particular tool 120 is then moved to the Y1 coordinate value (Y0) of the rotational axis of the workpiece W and is subsequently moved in the X1 axis direction to cut into and machine the workpiece W. Because the blade edges of the respective tools 120 are aligned with the second feed axis B, the tools 120 can be switched by moving the tool post 112 along the second feed axis B regardless of the staggering of the blade edges in the X1 axis direction, as shown in FIG. 7.

Figure 7:
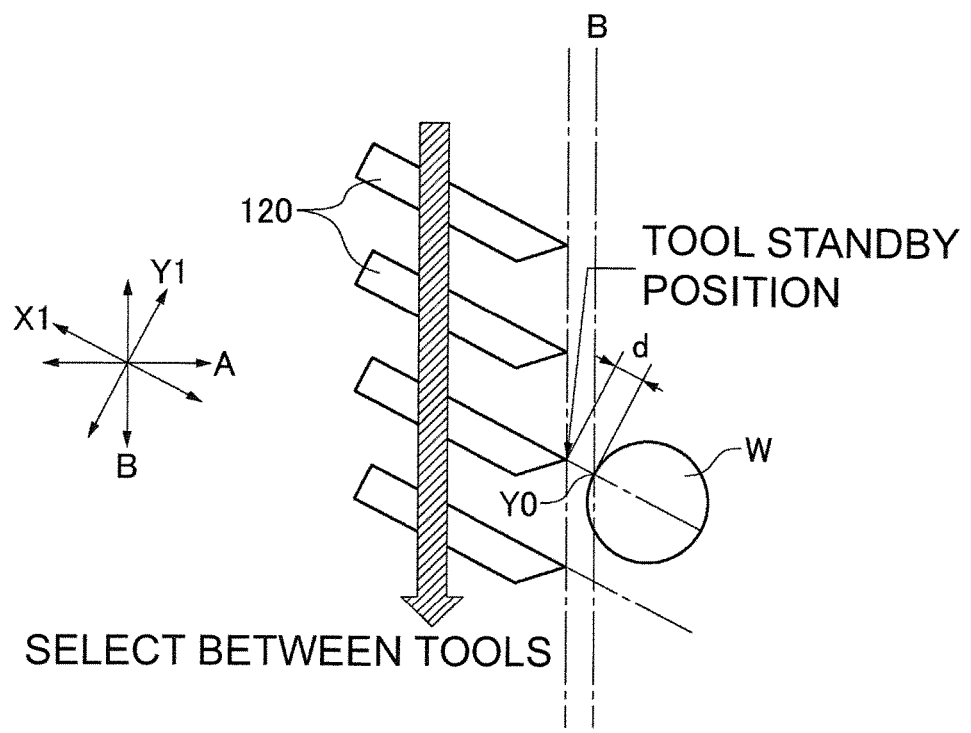
FIG. 7 is a conceptual diagram describing a state in which tools are switched.

For example, as shown in FIG. 7, in order to switch between the tools 120, a particular tool 120 that has been used in machining operation is moved from the surface of the workpiece W to an escape position, or a tool standby position, which is a small distance d away from the surface of the workpiece W in the X1 axis direction, or the cut-in direction of the tool 120. Because the blade edges of the respective tools 120 are aligned with a straight line that is along the second feed axis B and that passes through the tool standby position, next machining operation can be started by simply moving the tool post 112 along the second feed axis B to position another tool 120 that will be used in next machining operation to the standby position, regardless of the staggering of the blade edge, and then moving the another tool 120 by the distance d, which is a minimum moving distance common to all the tools 120, without considering the amount of stagger of the blade edges. Also, because the stroke length needed for starting the machining operation is common to all the tools 120, a processing stroke does not need to be made longer in accordance with the amount of stagger of the blade edges in the X1 axis direction.

Thus, because the blade edges of the plurality of tools 120 are aligned with a straight line along the selection axis for selecting between the tools 120, such as the second feed axis B, the respective tools 120 can be directly moved to the tool standby position to reduce wasted time in non-cutting operation. In addition, by selecting the second feed axis B as the selection axis and inclining the tools 120 as a unit so that the blade edges of the respective tools 120 are aligned with the second feed axis B, the strokes of the first feed screw 111A and the second feed screw 111B can be determined in accordance with the rotation (inclination) angle of the X1-Y1 coordinate system with respect to the A-B coordinate system without depending on the amount of stagger of the blade edges of the respective tools 120. Thus, the strokes of the first feed screw 111A and the second feed screw 111B do not need to be made longer by a length corresponding to the amount of stagger of the blade edges, and the first feed screw 111A and the second feed screw 111B can be made compact. Particularly, because the tools 120 are arranged in the vertical direction, the stroke length in the horizontal direction does not need to be made longer and the machine tool 100 can thus be made compact in the horizontal direction. Furthermore, in the present embodiment, because the stroke lengths of the first feed screw 111A and the second feed screw 111B do not need to be made longer, the machine tool 100 can be made compact both in the horizontal and in the vertical direction.

Although in the above embodiment the second feed axis B is selected as the selection axis and the blade edges of the respective tools 120 are aligned with the second feed axis B, it is also possible to select the first feed axis A as the selection axis and to align the blade edges with the first feed axis A. In this case, the tools 120 are switched by moving the tool post 112 along the first feed axis A.

Figure 8:
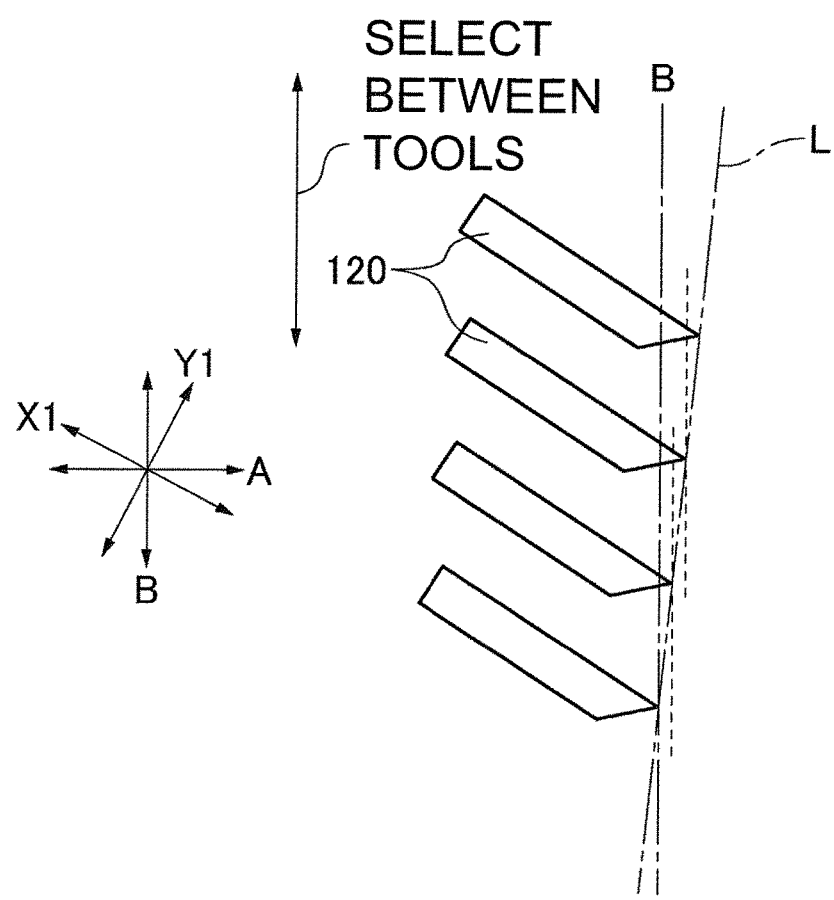
FIG. 8 is a conceptual diagram describing another inclined state of the plurality of tools with respect to the second feed axis.

In the present embodiment, the wording that "the blade edges of the plurality of tools are aligned with a straight line along the selection axis of the tools" includes a situation in which a blade edge of an upper tool 120 of any two adjacent tools of the plurality of tools 120 projects with respect to a blade edge of a lower tool 120 of the two adjacent tools for only a certain length with which cutting chips generated in machining operation with the upper tool 120 do not fall on the lower tool 120, as shown in FIG. 8.

In other words, as long as the projection of the upper tool 120 with respect the lower tool 120 is restricted to a certain length with which cutting chips generated in machining operation with the upper tool 120 do not fall on the lower tool 120, the straight line L passing through the blade edges of the plurality of tools 120 is not required to coincide with the second feed axis B and may be simply along the second feed axis B, as shown in FIG. 8. With this arrangement of the tools 120, cutting chips generated in the machining operation with the upper tool 120 do not fall on the lower tool 120. Thus, adhesion of the cutting chips to the tools 120 can be prevented. The straight line L may be used as the selection axis.

Figure 9:
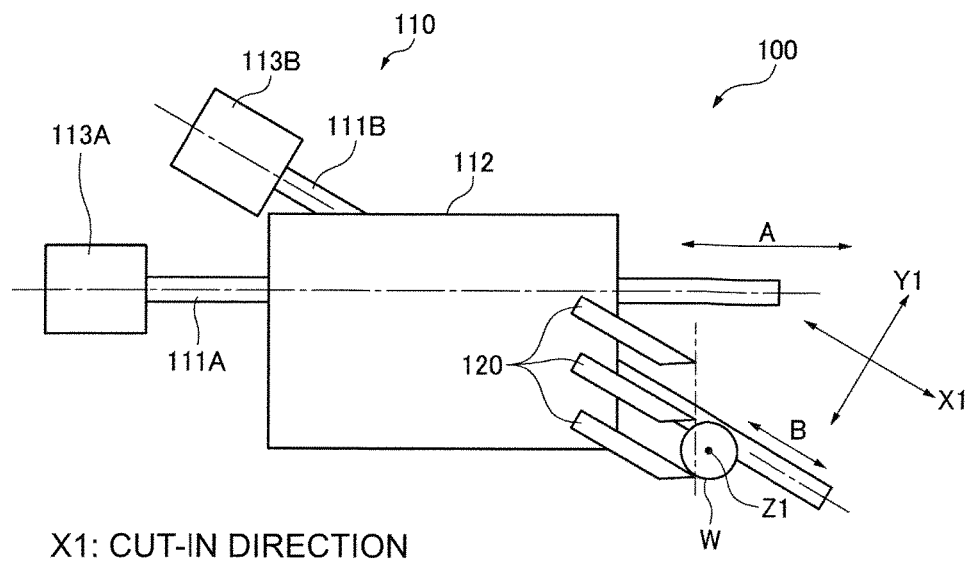
FIG. 9 is a schematic front view of the main part of a machine tool in accordance with another embodiment of the invention.
Figure 10A:
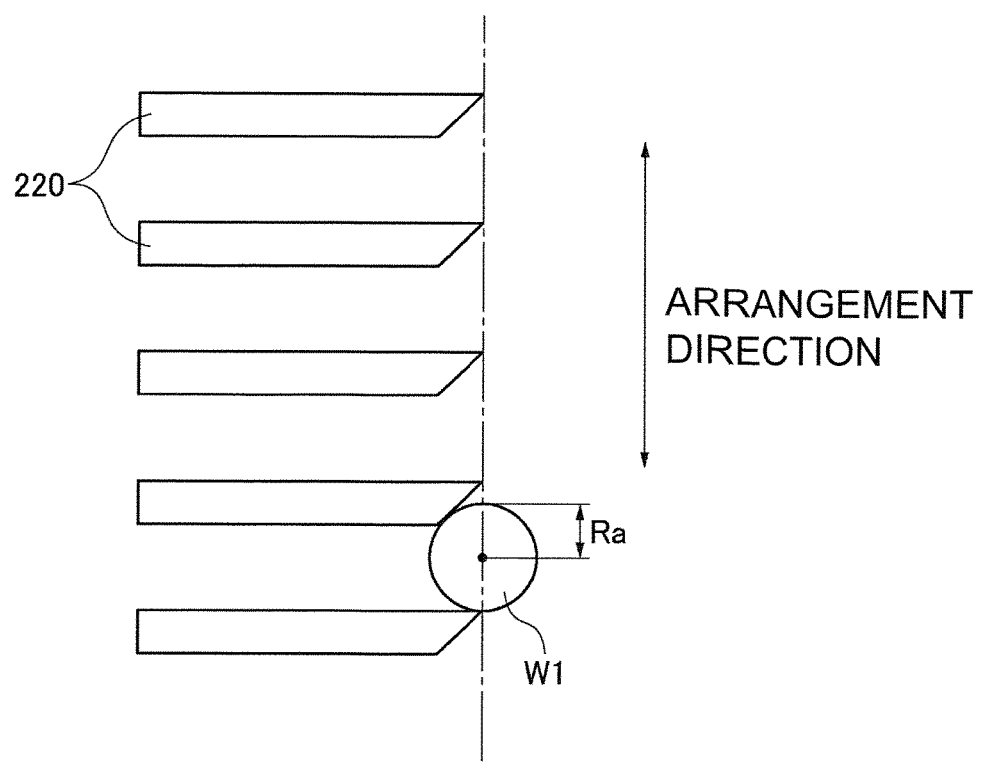
FIG. 10A is a conceptual diagram illustrating a first relative positional relationship between a plurality of tools and a workpiece in a conventional machine tool.
Figure 10:
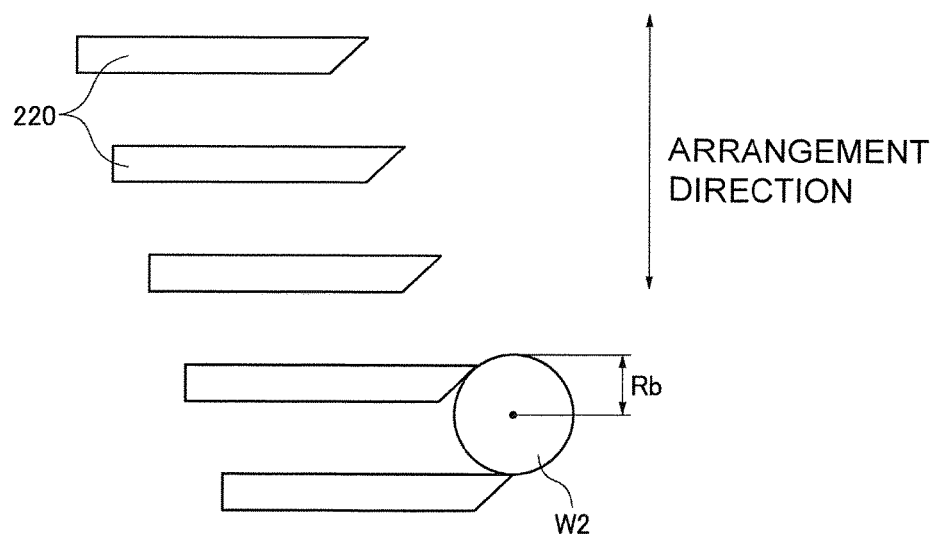
FIG. 10B is a conceptual diagram illustrating a second relative positional relationship between a plurality of tools and a workpiece in a conventional machine tool.
Figure 11:
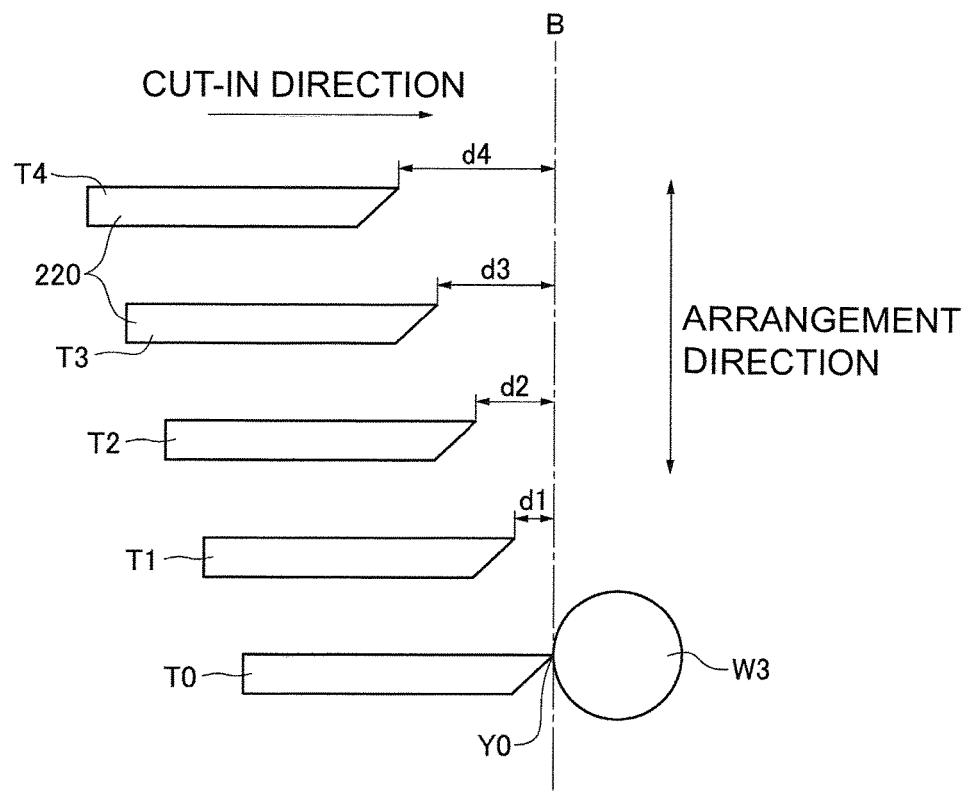
FIG. 11 is a conceptual diagram illustrating a third relative positional relationship between a plurality of tools and a workpiece in a conventional machine tool.

Although in the above embodiment the first feed axis A and the second feed axis B are orthogonal to each other and the tools 120 (the tool post 112) are moved in the X1 axis direction with the combined action of the first feed screw 111A and the second feed screw 111B, the second feed screw 111B may be provided along the X1 axis direction so that the second feed axis B is in the X1 axis direction, as shown in FIG. 9.

In this case, the tool post 112 can be moved along the first feed axis A by driving only the first feed screw 111A and can be moved along the X1 axis direction by driving only the second feed screw 111B. This enables easy and low-load movement of the tool post 112.

The invention claimed is:

1. A machine tool comprising:
movement means having a first feed axis and a second feed axis that mutually intersect; and
a tool post movable with the movement means, the tool post including a plurality of tools mounted thereon, each of said tools having a respective work-engaging edge, and said plurality of tools being movable as a unit along with movement of the tool post with the movement means;
the tool post having a predetermined cut-in direction along which said plurality of tools mounted on the tool post are moved to adjust the depth of cut-in in a turning operation;
said plurality of tools being mounted on the tool post so that machining of a workpiece is executed by movement of the tool post in the cut-in direction;
machining of the workpiece being executed by a selected one of said plurality of tools by moving the tool post in the cut-in direction;
each of said plurality of tools mounted on the tool post being selectively switchable by movement of said plurality of tools in a direction of a selection axis, said selection axis intersecting said cut-in direction;

the tools of said plurality of tool being arranged side by side in the direction of said selection axis;

each of said plurality of tools having a respective longitudinal axis that is inclined with respect to a predetermined reference plane;

the respective work-engaging edges of said plurality of tools being staggered in a stepwise fashion in the cut-in direction; and said plurality of tools being arranged such said work-engaging edges thereof are substantially aligned with a straight line, said straight line extending through each of said work-engaging edges and being perpendicular to said predetermined reference plane.

2. The machine tool according to claim 1, wherein one of the first feed axis and the second feed axis is the selection axis of said plurality of tools.

3. The machine tool according to claim 2, wherein said first feed axis extends in a horizontal direction and said second feed axis extends in a vertical direction, and said first feed axis and said second feed axis are orthogonal to each other.

4. The machine tool according to claim 3, wherein said plurality of tools is arranged in said vertical direction, whereby said plurality of tools comprises plural pairs of adjacent tools of said plurality of tools, each of said pairs consisting of an upper tool and an adjacent lower tool, the upper tool of each of said pairs being located above the lower tool of the same one of said pairs in said vertical direction.

5. The machine tool according to claim 4, wherein, for each of said plural pairs of adjacent tools of said plurality of tools, the work-engaging edge of the upper tool of each of said pairs of tools projects with respect to the work-engaging edge of the lower tool of the same one of said pairs of tools by an amount sufficient that cutting chips generated in the turning operation using the upper tool of each of said pairs of tools do not fall on the lower tool of the same one of said pairs of tools.

6. The machine tool according to claim 2, wherein, with respect to the one of the first feed axis and the second feed axis that is the selection axis, the other of the first feed axis and the second feed axis is inclined and extends parallel to the longitudinal axes.

7. The machine tool according to claim 1, wherein each tool of said plurality of tools mounted on the tool post has the same cut-in direction; and movement of said tool post in the turning operation is limited to said same cut-in direction.

8. The machine tool according to claim 7, wherein one of the first feed axis and the second feed axis is the selection axis of said plurality of tools.

9. The machine tool according to claim 8, wherein said first feed axis extends in a horizontal direction and said second feed axis extends in a vertical direction, and said first feed axis and said second feed axis are orthogonal to each other.

10. The machine tool according to claim 9, wherein said plurality of tools is arranged in said vertical direction, whereby said plurality of tools comprises plural pairs of adjacent tools of said plurality of tools, each of said pairs consisting of an upper tool and an adjacent lower tool, the upper tool of each of said pairs being located above the lower tool of the same one of said pairs in said vertical direction.

11. The machine tool according to claim 10, wherein, for each of said plural pairs of adjacent tools of said plurality of tools, the work-engaging edge of the upper tool of each of said pairs of tools projects with respect to the work-engaging edge of the lower tool of the same one of said pairs of tools by an amount sufficient that cutting chips generated in the turning operation using the upper tool of each of said pairs of tools do not fall on the lower tool of the same one of said pairs of tools.

12. The machine tool according to claim 8, wherein, with respect to the one of the first feed axis and the second feed axis that is the selection axis, the other of the first feed axis and the second feed axis is inclined and extends parallel to the longitudinal axes.

* * * * *